March 8, 1960 J. J. ZIMMERMANN 2,927,964

AUTOMATIC DISCONNECT APPARATUS FOR TELEPHONE ANSWERING DEVICE

Filed April 21, 1953

INVENTOR.
JOSEPH J. ZIMMERMANN
BY Andrus Sceales
ATTORNEYS

United States Patent Office 2,927,964

Patented Mar. 8, 1960

2,927,964

AUTOMATIC DISCONNECT APPARATUS FOR TELEPHONE ANSWERING DEVICE

Joseph J. Zimmermann, Milwaukee, Wis., assignor to Electronic Secretary Industries, Inc., Waukesha, Wis., a corporation of Wisconsin Application April 21, 1953, Serial No. 350,169

4 Claims. (Cl. 179—6)

This invention relates to an automatic apparatus for disconnecting telephone answering apparatus whenever a calling party causes his telephone to be in open condition.

An object of the invention is to provide a device to automatically operate the reject or disconnect mechanism of a reproducer in a telephone answering apparatus so that the telephone talking circuit is opened and the apparatus is returned to a standby position.

Another object of the invention is to provide a disconnect system in a telephone answering device which is responsive to the dial tone of the telephone.

Another object of the invention is to provide automatic apparatus for conserving the recording record of telephone answering apparatus.

A further object of the invention is to provide an automatic disconnect system for a telephone answering device which will not operate in response to voice peaks in the telephone or in response to extraneous noises.

The invention, in general, comprises a telephone answering device operably associated with a telephone, a voltage pickup, a voltage amplifier and a relay in an electrical circuit to operate a timing relay. A solenoid is mechanically connected to a switch for cessation of telephone answering device and allowing it to return to standby condition. The solenoid is connected for energization to a voltage source through the aforementioned timing relay. A voltage is induced in the pickup by the dial tone of the telephone whenever a calling party "hangs up" before the telephone answering device has completed a cycle of operation. The voltage actuates the timing relay, thereby closing a circuit to energize the solenoid. The plunger of the solenoid retracts and operates the standby reset switch in the telephone answering device. The latter opens the telephone talking circuit and thereby shuts off the disconnect device and allows it to reset to standby position.

Figure 1:
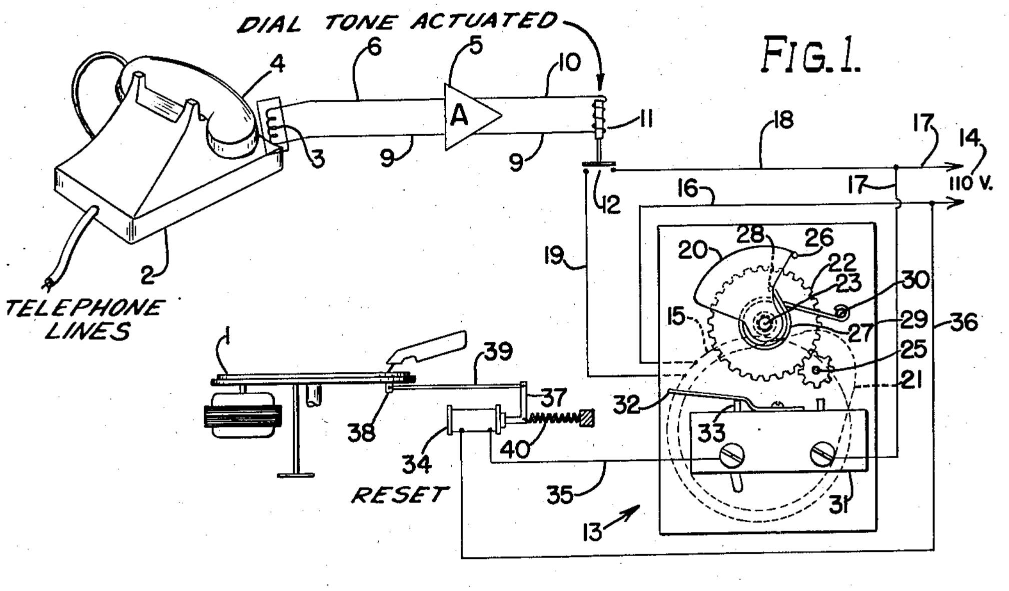
Figure 1 is a diagram of the invention including the wiring thereof and an illustrative reproducer of a telephone answering apparatus.

Referring to the drawing, the embodiment of the automatic disconnect apparatus illustrated in Figure 1 includes a telephone answering device of which only the reproducer 1 is shown. The telephone answering device is preferably constructed such that the reproducer 1 is employed to shut off the device and allow the device to return to standby condition, as in my co-pending application filed September 26, 1949, Serial Number 117,759, now Patent No. 2,658,107, granted November 3, 1953. The telephone answering device is operably connected with a telephone 2, shown as a French type in the drawing. The disconnect apparatus may be utilized with any telephone answering device which is adapted to be reset to a standby condition before a cycle of operation is completed.

A pickup 3 which is preferably of a sensitive induction coil variety is mounted near the ear portion 4 of telephone 2. A voltage is induced in the pickup 3 by sound currents in the telephone lines. The pickup 3 is connected to a voltage amplifier 5 by the conductors 6 and 7.

Figure 2:
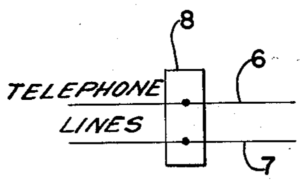
Fig. 2 is a diagrammatic view illustrating a means for direct connection of the invention to the telephone lines.

Rather than employing an induction coil pickup, the disconnect apparatus may be connected directly across the telephone lines. A suitable manner of direct connection of the apparatus is to connect the conductors 6 and 7 across the incoming telephone lines at a standard telephone terminal block 8, as shown in Fig. 2.

The conductors 9 and 10 connect the output of the voltage amplifier 5 to a relay 11 which is preferably a sensitive type plate relay. The relay contacts 12 are connected in circuit with a timing relay 13 and a 110-volt alternating current source 14 as described below.

The relay 11 is constructed such that the contacts 12 are held in a closed condition only in response to a relatively continuous sound of a predetermined minimum amplitude. The amplitude requirement is preferably set at the dial tone amplitude, although it may be set somewhat lower. The limits for the amplitude requirement are such that the contacts 12 are not held in a closed condition by an incoming message but are held in a closed condition by the dial tone of the telephone 2. The contacts 12 may be momentarily closed by voice peaks of an incoming message and extraneous noises without effecting satisfactory operation of the device as subsequently explained.

The timing relay 13 includes a motor 15 which is preferably of a synchronous variety. The motor 15 is energized through a series circuit with relay contacts 12 and the 110-volt alternating current source 14 as follows: starting with the motor 15, conductor 16, voltage source 14, conductors 17 and 18, relay contacts 12 and conductor 19 back to motor 15.

A speed reducing gear train, engaging the motor 15 and a cam 20 causes rotation of the cam 20 while the motor 15 is energized. A portion of the gear train is hidden in the gear housing 21 which is disposed adjacent the motor 15. The balance of the gear train consists of a large gear 22 keyed to shaft 23 and a small gear keyed to a shaft 25. The shaft 25 extends into the gear housing 21 and is suitably connected to the portion of the gear train therein. The cam 20 is keyed to shaft 23 and rotates therewith.

Biasing the cam 20 to an initial position against a stop stud 26 is a coil spring 27. The coil spring 27 is preferably concentric with shaft 23 with its one end attached to the cam 20 by a pin 28 and with its other end attached to the support bracket 29 by pin 30.

A switch 31 is positioned in the path or rotation of cam 20 for actuation thereby. The switch 31 is preferably of a low pressure type. The switch 31 is normally open and is held in a closed position only when the cam 20 engages the switch arm 32 and closes the contacts 33.

When the switch 31 is closed, the solenoid 34 or other suitable electromagnetic means is energized through the following circuit: starting with the solenoid 34, conductor 35, switch 31, conductor 17, voltage source 14, conductor 16 and conductor 36 back to solenoid 34.

Plunger 37 of solenoid 34 is attached to the reject mechanism 38 of reproducer 1 by a rigid member 39. The plunger 37 is suitably biased to open position as by a spring 40 connected to the plunger and a stationary member such as reproducer 1.

The timing relay 13 of Figure 1 may be replaced by any other suitable timing relay apparatus which returns to a normal initial position very quickly after de-energization thereof. For purposes of illustration, Figure 3 illustrates a suitably damped solenoid 41 that may replace the timing relay 13.

Figure 3:
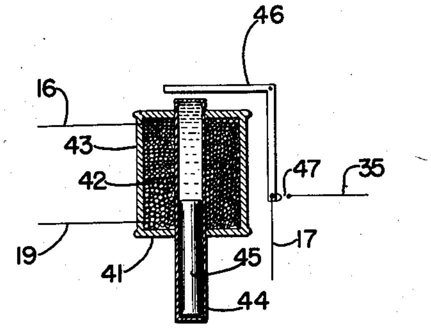
Fig. 3 is a view partly in section and partly in elevation of an alternative timing relay which may be utilized in the invention.

Referring to Figure 3, there is shown a solenoid winding 42 housed within a tubular casing 43. A closed cylinder 44 is supported in the center opening of the solenoid 41. An iron rod 45 or the like moves upwardly within the cylinder 44 and increases the induction of the solenoid 41 when the solenoid winding 42 is energized. When the iron rod 45 moves to its uppermost position, the inductance of the solenoid is sufficiently great to pull in the armature 46 and mechanically close the contacts 47. The time duration taken for the iron rod 45 to move upwardly is controlled by substantially filling the cylinder 44 with oil or other suitable liquid. When the solenoid winding 42 is de-energized, the iron rod 45 drops to its initial position in the bottom of the cylinder 45 because of its own weight.

The solenoid 41 is inserted in the circuit of the invention in place of timing relay 13, as follows. The solenoid winding 42 is connected across the conductors 16 and 19, replacing the motor 15. The contacts 47 are connected across conductors 17 and 36, replacing switch 31 of Figure 1. Other than for the above noted changes the embodiment of the invention illustrated in Figure 3 is the same as that in Figure 1.

The operation of the invention is described with respect to Figure 1 as follows: Assume a call is received and the telephone answering device begins a cycle of operation. Further, assume that the calling party "hangs up" his phone, thereby opening his talking circuit before the telephone answering device has completed its cycle. A dial tone is caused in the ear portion 4 of the telephone's handset which is manifested electrically by a magnetic field in the ear portion 4 of the telephone 2. A voltage is induced in pickup 3 by the magnetic field and impressed on the input of amplifier 5. The induced voltage is amplified by amplifier 5 and impressed on relay 11 which operates to close the normally open contacts 12 and thereby place the motor 15 in circuit with the 110-volt alternating voltage source 14, as previously described.

The motor 15 is energized and drives the gear assembly during the period that the contacts 12 are held closed by relay 11. The gear assembly causes the cam 20 to rotate in a counter-clockwise direction against the bias of spring 27 and after a predetermined period of rotation to close the contacts 33.

The delay in the closing of contacts 33 by cam 20 is necessary so that the invention does not operate the reject mechanism 38 when a voltage is momentarily induced in the pickup 3 by voice peaks or extraneous noises in the ear portion 4 of the telephone 2. In the event of a momentary voltage impulse, the motor 15 operates to advance the cam 20 slightly, but the cam 20 is immediately returned to its initial position by the spring 27 at the cessation of the voltage impulse.

However, a continuous dial tone causes the motor 15 to operate continuously during the period of the dial tone and causes the cam 19 to engage switch arm 32 after a predetermined period of time and thereby close contacts 33. With the contacts 33 in a closed position, the voltage source 13 energizes the solenoid 34 through the energization circuit previously described. The energization of the solenoid 34 causes the retraction of the solenoid plunger 37 against the bias of spring 40.

When the solenoid plunger 37 retracts, the reject mechanism 38 of the reproducer 1 is actuated which operates to discontinue the operation of the telephone answering device and allows the device to reset to a standby condition for another cycle of operation. The telephone 2 is thereby placed in open condition and the dial tone is no longer present in the ear portion of the telephone.

When the dial tone is discontinued, the magnetic field generated thereby is likewise discontinued and there is no voltage induced in the pickup 3. The relay 11 is de-energized and its contacts 12 open. The opening of relay contacts 12 de-energizes the motor 15 and the spring 27 then returns the cam 20 to its initial position; disengaged from switch arm 32. The contacts 33 open and break the energizing circuit for solenoid 34. Spring 40 then acts to return the solenoid plunger 35 and reject mechanism to normal position. In this manner, the automatic disconnect system is reset to standby condition.

The variation in the operation of the apparatus with the modifications illustrated in Figs. 2 and 3 are fully explained with the structural description and no further explanation is deemed necessary.

Various embodiments of the invention may be employed within the scope of the accompanying claims.

I claim:

1. In an automatic device for resetting to a standby condition telephone answering apparatus having a reproducer with a movable reject mechanism and adapted to be reset to a standby condition by the reject mechanism, means to pick up a voltage in response to an incoming signal received over a telephone circuit operably associated with said answering apparatus; a relay connected to said named means in order to be energized thereby, said relay having contacts and having a maximum pull in voltage equal to the voltage applied to the relay as a result of a dial tone in the telephone, a timing relay having timing contacts and operable to close its contacts after a predetermined period of energization, said first named relay having its contacts connected in the energization circuit of said timing relay, electromagnetic means mechanically connected to the reject mechanism of the reproducer to actuate the same when energized, said timing relay having its timing contacts and said electromagnetic means in series circuit with a source of voltage whereby the timing contacts control energization of said electromagnetic means, and means to reset said reject mechanism to a normal position after it has been actuated.

2. The combination as defined by claim 1 in which said timing relay comprises a movable core oil damped solenoid.

3. In an automatic system for disconnecting a telephone answering device operably associated with a telephone and utilizing a reproducer with a reject mechanism to control a cycle of operation, said telephone being connected in a telephone line circuit having a continuous dial tone signal transmitted to the connected call telephone if the calling telephone is disconnetced, an induction coil mounted adjacent the ear portion of said telephone to pick up a voltage in response to sound currents, a relay connected to said induction coil, a voltage amplifier connected in circuit between said induction coil and said relay, a motor connected in circuit with said relay and a source of voltage whereby said motor is energized when said relay is energized, a cam connected to said motor to be rotated when the motor is energized, a switch disposed in the path of said cam and held in a closed position by engagement therewith, a spring connected to bias said cam to an initial position disengaged from said switch whereby said switch is closed in response to only the dial tone, a solenoid connected in circuit with said switch and a voltage source for energization while said switch is closed, a rigid member connecting said solenoid to said reject mechanism and spring means biasing said solenoid to open position and holding said solenoid in open position when the solenoid is de-energized.

4. In an automatic device for resetting to standby condition a cyclic telephone answering apparatus operably associated with a telephone system to answer incoming calls, and having a reproducer adapted to establish an initial answering message and to reset the apparatus to standby, electromagnetic means connected to the reproducer of the telephone answering apparatus and being adapted to actuate the reproducer to interrupt a cycle of operation and immediately reset the reproducer to standby, means connecting said electromagnetic means and the telephone system, said means including means responsive to predetermined sound currents in the telephone system received if a calling party opens his talking circuit prior to completion of a cycle of operation of the answering apparatus.

References Cited in the file of this patent

UNITED STATES PATENTS

| | | |
|---|---|---|
| 2,519,568 | Handschin | Aug. 22, 1950 |
| 2,542,192 | Handschin | Feb. 20, 1951 |
| 2,743,315 | Van Deventer et al. | Apr. 24, 1956 |
| 2,784,254 | Lane | Mar. 5, 1957 |